3,690,907
METHOD OF PRODUCING CLAY-BASE PIGMENT
Roger D. Kroening, Bay City, and David B. Kirby, Midland, Mich., assignors to The Dow Chemical Company, Midland, Mich.
No Drawing. Filed May 20, 1970, Ser. No. 39,138
Int. Cl. C09c 1/02
U.S. Cl. 106—306                                        4 Claims

ABSTRACT OF THE DISCLOSURE

A method of producing a clay-base pigment with improved optical properties which comprises forming an aqueous mixture of clay with an alkaline earth metal hydroxide, e.g. calcium hydroxide, and aging the mixture at elevated temperatures.

BACKGROUND OF THE INVENTION

Clays are often used as components in pigment formulations, for example, for paper coatings. The optical properties of the clay have been upgraded by various methods including acid treatment, mechanical pulping, water washing, size classification, calcination and the addition of other pigment grade materials such as titanium dioxide and calcium carbonate.

The term "clay," as used herein, refers to kaolin type clay, the variety of clay generally used as a pigment.

An object of the present invention is to provide a method of producing a clay-base pigment with improved optical properties.

THE INVENTION

The present method comprises forming an aqueous mixture of clay with an alkaline earth metal hydroxide and aging the mixture at an elevated temperature. The clay base pigment so produced has improved optical properties, e.g. scattering coefficient.

In carrying out the present method an aqueous clay-alkaline earth metal hydroxide mixture is formed, for example, by admixing a clay slurry, e.g. 20 wt. percent solids, with the alkaline earth metal hydroxide in a suitable container. Alternatively, the clay, which is normally water washed and spray dried, is admixed with an aqueous slurry of the alkaline earth metal hydroxide or the clay and alkaline earth metal hydroxide are mixed dry and the water added to form the aqueous mixture. Amounts of alkaline earth metal hydroxide added on the order of from about 0.5 to 20 parts per 100 parts of clay (dry weight basis) are satisfactory.

The aqueous clay-alkaline earth metal hydroxide mixture is aged at an elevated temperature, e.g. from about 50° C. to 180° C. Above 100° C., super atmospheric pressure is necessary. The amount of alkaline earth metal hydroxide and the time (e.g. about 30 minutes to 200 hours) and temperature of aging can be adjusted to achieve a clay-base pigment with the desired optical properties. Depending on the alkaline earth metal hydroxide added, the properties improve with aging time and then level off.

The treated clay can be spray dried for packaging as a free flowing solid material or dewatered to greater than 65 percent solids for wet shipping.

In the following examples brightness and opacifying power of various pigment compositions were determined by use of conventional apparatus as follows. A photovolt reflectometer was employed to compare the reflectance of a dry test coating specimen relative to a standard dry MgO specimen which is considered to have a 100 percent reflectance. The opacifying power of the pigment composition was estimated by the Mitton-Jacobsen method, whereby a coating is cast on a black glass panel with a Bird doctor blade at a thickness of about one mil. A 5 sq. in. area of this slightly translucent film is measured for reflectance, $R_B$, and likewise the reflectance $R\infty$ of a thick layer over white glass. These readings are then converted by means of published graphs (Official Digest, vol. 35, September 1963, p. 864+) into values of scattering power, the measured area of the coating is then removed from the black glass and weighed, thus enabling expression of the scattering coefficient, SC, in terms of an accurately known coating weight unit (lbs. per TAPPI ream).

EXAMPLES

Several samples of 20% solids, aqueous clay slurries were prepared using Georgia kaolin clay (No. 1 coating grade) containing about 0.3% tetrasodium pyrophosphate for easy dispersion. Varying amounts of alkaline earth metal hydroxides were added to some of the samples and the resultant mixtures aged at elevated temperatures. Excess water was removed from the aged mixture by filtering, yielding about a 40–50% solids filter cake. This filter cake was admixed with a latex binder and water in such amounts as to produce a 35% solids formulation containing 100 grams of pigment (modified clay) and 15 grams latex binder. The scattering coefficient of the formulation was then determined. For comparison purposes the scattering coefficient was determined for clay without additives and with additives but without aging at elevated temperatures. The results are shown in the table.

The control example (Example A) indicates the unmodified clay has a scattering coefficient of about 0.139. The clay-base pigments of the present method have significantly increased values (Examples 1–14). The mechanism by which this improvement is achieved is not clearly defined or understood. Merely adding $Mg(OH)_2$ without aging at elevated temperatures was not beneficial (Example C). It is noted that the $Ca(OH)_2$ addition without aging did increase the scattering coefficient (Example B). However, viscosity measurements of the various samples were also taken by a Brookfield viscometer. It was observed that the unaged, $Ca(OH)_2$ added sample (Example B) had a very high viscosity. When the sample was aged at elevated temperature, the viscosity was reduced to adequate levels. Thus, the addition of the alkaline earth metal hydroxide and the aging of the mixture at elevated temperature are necessary to achieve an improved pigment with low viscosity.

In a similar manner other amounts of various alkaline earth metal hydroxides can be added to clay and the resultant mixture aged at elevated temperature to improve the clay optical properties.

TABLE

| Example | Additive, parts per 100 parts clay | Aging Time, hrs. | Temp., °C. | SC |
|---|---|---|---|---|
| A—control | None | None | RT | 0.139 |
| B—comparative | 2.95 $Ca(OH)_2$ | None | RT | 0.189 |
| 1 | 2.95 $Ca(OH)_2$ | 1 | 100 | 0.185 |
| 2 | 2.95 $Ca(OH)_2$ | 4 | 100 | 0.223 |
| 3 | 2.95 $Ca(OH)_2$ | 24 | 100 | 0.234 |
| 4 | 2.95 $Ca(OH)_2$ | 48 | 100 | 0.235 |
| 5 | 2.95 $Ca(OH)_2$ | 168 | 100 | 0.233 |
| C—comparative | 2.95 $Mg(OH)_2$ | None | RT | 0.138 |
| 6 | 2.95 $Mg(OH)_2$ | 1 | 100 | 0.145 |
| 7 | 2.95 $Mg(OH)_2$ | 4 | 100 | 0.143 |
| 8 | 2.95 $Mg(OH)_2$ | 24 | 100 | 0.171 |
| 9 | 2.95 $Mg(OH)_2$ | 48 | 100 | 0.185 |
| 10 | 2.95 $Mg(OH)_2$ | 168 | 100 | 0.224 |
| 11 | 2.91 $Ba(OH)_2$ | 168 | 100 | 0.156 |
| 12 | 0.99 $Ca(OH)_2$ | 168 | 100 | 0.164 |
| 13 | 2.93 $Ca(OH)_2$ | 168 | 100 | 0.225 |
| 14 | 4.31 $Ca(OH)_2$ | 168 | 100 | 0.233 |

What is claimed is:
1. A method which comprises:
   (a) forming an aqueous mixture of clay and alkaline earth metal hydroxide wherein the alkaline earth metal hydroxide is employed in the mixture in an amount from about 0.5 to about 20 parts by weight per 100 parts of clay;

(b) aging the mixture at an elevated temperature; and (c) admixing the aged mixture with a binder to form a pigmented paper coating composition.

2. The method of claim 1 wherein the alkaline earth metal hydroxide is calcium hydroxide.

3. The method of claim 1 wherein the aging is carried out at a temperature within the range of from about 50° C. to 180° C.

4. The pigmented paper coating composition produced by the method of claim 1.

References Cited

FOREIGN PATENTS 596,400   4/1960   Canada _____ 106—288 B

JAMES E. POER, Primary Examiner

J. V. HOWARD, Assistant Examiner

U.S. Cl. X.R.

106—72, 73, 288 B, 309